United States Patent [19]

Guillaume

[11] Patent Number: 5,090,773
[45] Date of Patent: Feb. 25, 1992

[54] DUMP TRUCK WITH INTERFITTING POLYGONAL DUMP BODY AND SUPPORTING CRADLE

[76] Inventor: Bernard Guillaume, 89 Vallon des Vaux, 06800 Cagnes Sur Mer, France

[21] Appl. No.: 685,172

[22] Filed: Apr. 15, 1991

Related U.S. Application Data

[63] Continuation of Ser. No. 454,971, Dec. 22, 1989, abandoned.

[30] Foreign Application Priority Data

Dec. 22, 1988 [EP] European Pat. Off. ........ 88440107.6

[51] Int. Cl.⁵ .................................................. B60P 1/04
[52] U.S. Cl. .................................. 298/17 R; 296/184; 298/1 R
[58] Field of Search ............... 298/17 R, 22 R, 1 A, 298/1 R; 296/184; D12/15, 98; 105/261.2

[56] References Cited

U.S. PATENT DOCUMENTS

| | | | |
|---|---|---|---|
| 1,499,969 | 7/1924 | Brown | 298/1 R |
| 1,514,769 | 11/1924 | Johnston et al. | 298/17 R |
| 1,595,152 | 8/1926 | Grindle | 105/261.2 |
| 1,641,913 | 9/1927 | Walker | 298/17 R |
| 1,957,497 | 5/1934 | Galanot | 298/22 R |
| 2,144,637 | 1/1939 | Pugh | 105/261.2 |
| 2,674,489 | 4/1954 | Maxon, Jr. | 298/22 R |
| 3,093,254 | 6/1963 | Sammarco | |
| 3,206,046 | 9/1965 | Houdeshell et al. | 105/261.2 X |
| 3,659,899 | 5/1972 | Phillips et al. | 298/1 A X |
| 3,909,146 | 9/1975 | Hoffman | 298/17 R X |
| 3,915,496 | 10/1975 | Mabry, Jr. | 298/1 A X |
| 4,126,357 | 11/1978 | Day | 298/1 A |
| 4,194,787 | 3/1980 | Williamsen | 105/261.2 |
| 4,684,142 | 8/1987 | Christenson | D12/15 X |

FOREIGN PATENT DOCUMENTS

| | | | |
|---|---|---|---|
| 875991 | 7/1971 | Canada | 298/22 R |
| 510987 | 10/1930 | Fed. Rep. of Germany . | |
| 1006274 | 4/1957 | Fed. Rep. of Germany | 298/17 R |
| 596836 | 11/1925 | France . | |
| 749022 | 7/1933 | France . | |
| 60494 | 2/1968 | German Democratic Rep. . | |
| 62-34828 | 2/1987 | Japan | 296/184 |
| 269734 | 10/1950 | Switzerland | 105/261.2 |
| 930163 | 7/1963 | United Kingdom | 298/22 R |

Primary Examiner—Robert J. Spar
Assistant Examiner—William M. Hienz
Attorney, Agent, or Firm—Young & Thompson

[57] ABSTRACT

A new mode of construction for vehicles having a dump body comprises a container (6) which rests on a fixed cradle (5) that serves as a chassis (1). The lower portion of the container (6) is adapted to be interfitted in the cradle due to the fact that the section of the cradle corresponds to the section of the lower portion (10) of the container of smaller dimensions, so as to permit the interfitting of the container in the cradle. The container and the cradle are constituted by volumes having substantially concentric transverse sections such that the lower portion (10) of the container precisely interfits in the cradle.

1 Claim, 2 Drawing Sheets

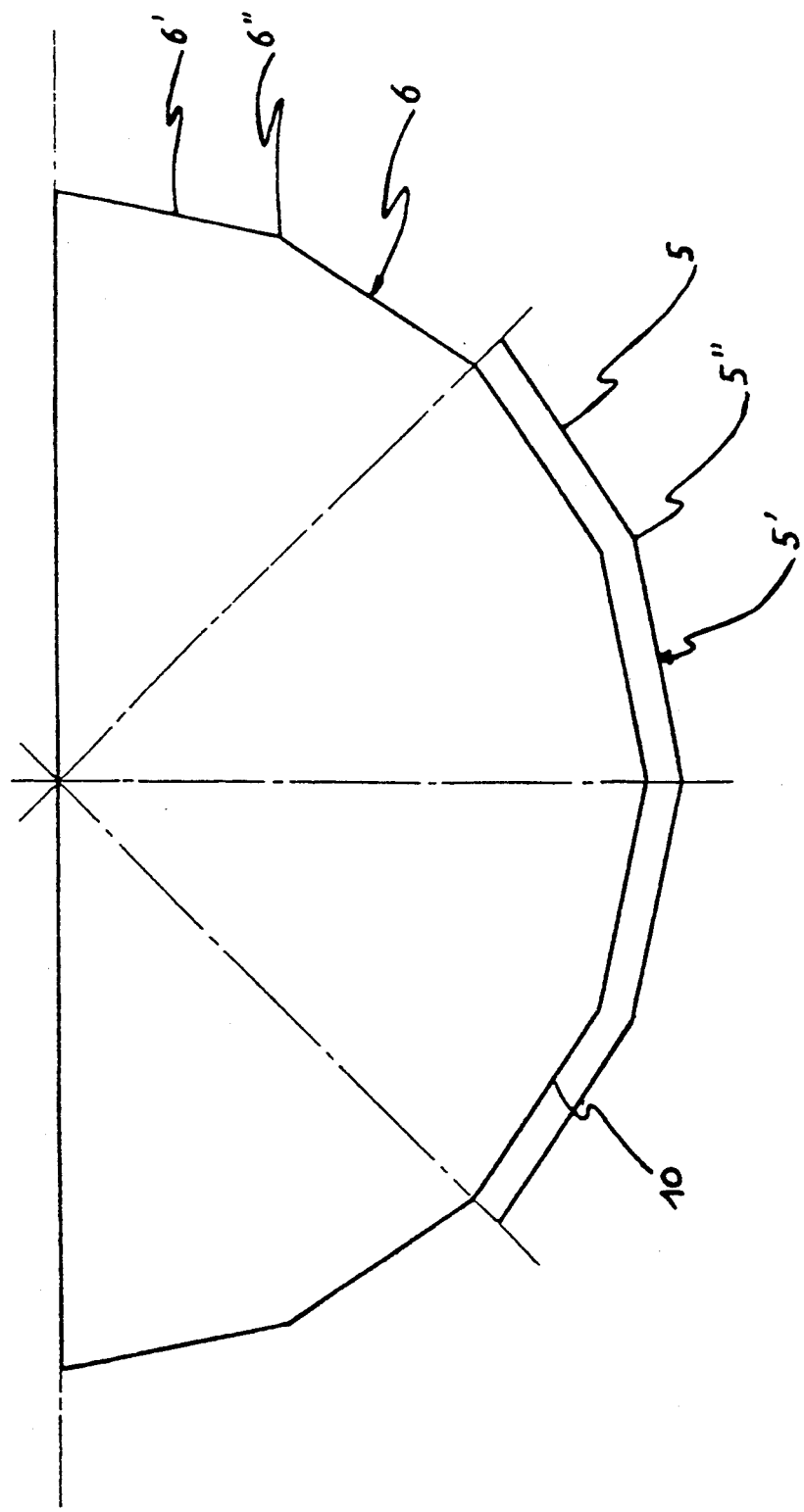
FIG_2

DUMP TRUCK WITH INTERFITTING POLYGONAL DUMP BODY AND SUPPORTING CRADLE

This application is a continuation of application Ser. No. 07/454,971, filed DEC. 22, 1989, now abandoned.

BACKGROUND OF THE INVENTION

1. Field of the Invention

The present invention concerns a new type of construction for dumping vehicles (dump trucks, dumping trailers and the like) widely used especially in public works, for the manipulation and transport of numerous materials. These vehicles comprise a dump body mounted for pivotal movement from the front toward the rear, and the invention is directed to the structure of these dump bodies.

2. Description of Prior Art

At present, these dump bodies essentially comprise a fixed frame, itself formed by two side members interconnected by electrically welded compartments, and support a tiltable container formed from a base itself stiffened with profiles, and sides also stiffened by profiles.

This ordinary mode of construction, although extremely widespread, still comprises numerous disadvantages:

the chassis supports the container at a relatively elevated height, which affects the stability of the vehicle.

the manufacture requires numerous operations of cutting, welding, assembly, etc., whose cost is substantial.

The state of the art may be defined by the following patents:

FR.749,022: This patent has as an object improvements to tank trucks. In particular, it describes the embodiment shown in FIGS. 5 and 6. The tank itself forms the chassis of the trailer and rests directly on the axle holders and has forwardly a special shape for resting on the tractor. The motor body is then mounted on supports fixed on the wall of the tank.

This does not concern a tilting dump body, but a tank truck. There is no correlation between the container and the cradlechassis.

DE.60,494: This patent describes a conventional dump body which rests in the conventional manner on its chassis, which is ordinary. The only novelty is that the container or compartment has a double base and permits obtaining a semicylindrical container. There is no interfitting of the container of the dump body in a cradle-chassis, but only a particular shape of the base of the container of the dump body mounted on a conventional chassis.

The patents FR-A-596,836, U.S. Pat. No. 3,093,254, DE-C-510,987 show only the background of the technology.

SUMMARY OF THE INVENTION

The present invention overcomes all these disadvantages, thanks to an original mode of construction of the container/chassis assembly.

The invention has as an object a dumping vehicle, comprising a container tilting from front to rear and resting on the chassis of the vehicle characterized by the fact that the said container rests on a fixed cradle, which serves as the chassis, and that the lower portion of the said container becomes interfitted in the cradle because the section of the cradle corresponds to the section of the lower portion of the container so as to permit the interfitting of the container in the cradle.

The said container rests on a fixed cradle serving as a chassis, and the said container and the said cradle are constituted by volumes having substantially concentric transverse sections such that the lower portion of the said container is precisely interfitted in the said cradle.

The transverse sections may be circular, the container consisting of a cylindrical volume of opening comprised between 90° and 360° and the cradle consisting of a cylindrical volume whose opening is comprised between 90° and 180°.

The said transverse sections may also be shaped as regular polygons.

The said transverse sections may also be shaped as irregular polygons of which the number and dimension of the sides corresponds between the lower portion of the container and the cradle, so as to assure a perfect interfitting.

The cradle forms the integrating portion of the chassis.

According to the invention, the body which will be designated hereafter as the "container" is constituted by a generally prismatic or cylindrical working volume obtained by folding or press-bending of a steel sheet, and the chassis, which will be designated hereafter as the "cradle" is also constituted by a generally prismatic or cylindrical working volume also obtained by folding or bending of a steel sheet. The lower portion of the container and the cradle have substantially concentric sections whose dimensions are essentially the same, so that the lower portion of the said container precisely interfits into the said cradle provided to this effect.

The cradle which receives the lower portion of the container forms the integrating portion of the chassis itself.

It will be understood that the two elements of this lower assembly portion of the chassis/cradle may have any desired dimensions, especially as regards their length, diameter and thickness of the steel used, according to the usage provided for the material, and conforming to the legal tolerances.

Nevertheless, the angle of opening of each cylindrical volume will be variable, on the one hand so as to permit interfitting of the lower portion of the container in the cradle, and on the other hand as a function of the location of the engine.

Thus, in a first instance, the cradle will have an opening comprised between about 90° and 180°, to permit the container to tilt and to be received horizontally without becoming jammed.

In a second instance, the opening of the container could vary between for example 180° (semi-cylindrical volume) and a complete cylinder (in that case admitting of drains or "manholes") for disposing a desired volume. For example, for a grain bed, this angle may be 270° (three quarters of a circle).

In this order of ideas, the invention provides for example a particularly advantageous application in the construction of dump bodies for handling rough masonry materials. Specially, the container in this case takes exactly the shape of the cradle with a very slight spacing, the thicknesses of their respective walls being joined, which increases the resistance of this material to shocks from the rocks at the time of loading. By way of example, a gravel dump body constructed from steel sheet of 10 mm thickness will have a weight of only about 6.5 tons, whereas with the known material, the weight of a comparable dump body will be 10 tons. The resulting savings in steel is thus considerable. To improve the empty weight, the chassis portion could be perforated, for example for the transport of foodstuffs.

This material moreover has a number of other technical advantages over the existing material:

thanks to its construction, the mass is concentrated at the center and decreased on the sides. The center of gravity is thus much lower, which assures improved stability relative to an identical volume.

the space between the load and the base of the cradle, which may be designated as "reserve" and which is on the order of 25 to 30 cm and more in the known materials, is reduced to only 2 to 5 cm. This considerable decrease is an essential factor making the present invention a considerable improvement. Specifically, there thus results an improved stability of the vehicle, not only during transit where the risk of tipping over it greatly reduced, but also in dumping, that is to say at the moment of evacuation by raising the container. An additional consequence is a large decrease of tire wear, which may, thanks to the invention, withstand twice as much mileage.

this construction permits eliminating the retaining jibs or reinforcement which create a shearing of the sheet-iron, and on which the container rapidly wears; moreover, it permits eliminating the retaining cross stays of the container, which leads to a substantial gain in width (2×10 cm, thickness of a crosspiece), as well as in a weight decrease.

finally, this construction permits lowering by about 30 cm the height of the sides of the container, which allows its loading by means of small machines.

BRIEF DESCRIPTION OF THE DRAWINGS

So as better to understand the invention, a description of a non-limiting embodiment will now be given, with reference to the accompanying drawing, in which:

and FIG. 2 is a vertical transverse section of the same material, the container of the dump body being in the lowered position.

DETAILED DESCRIPTION OF PREFERRED EMBODIMENTS

Figure 1:
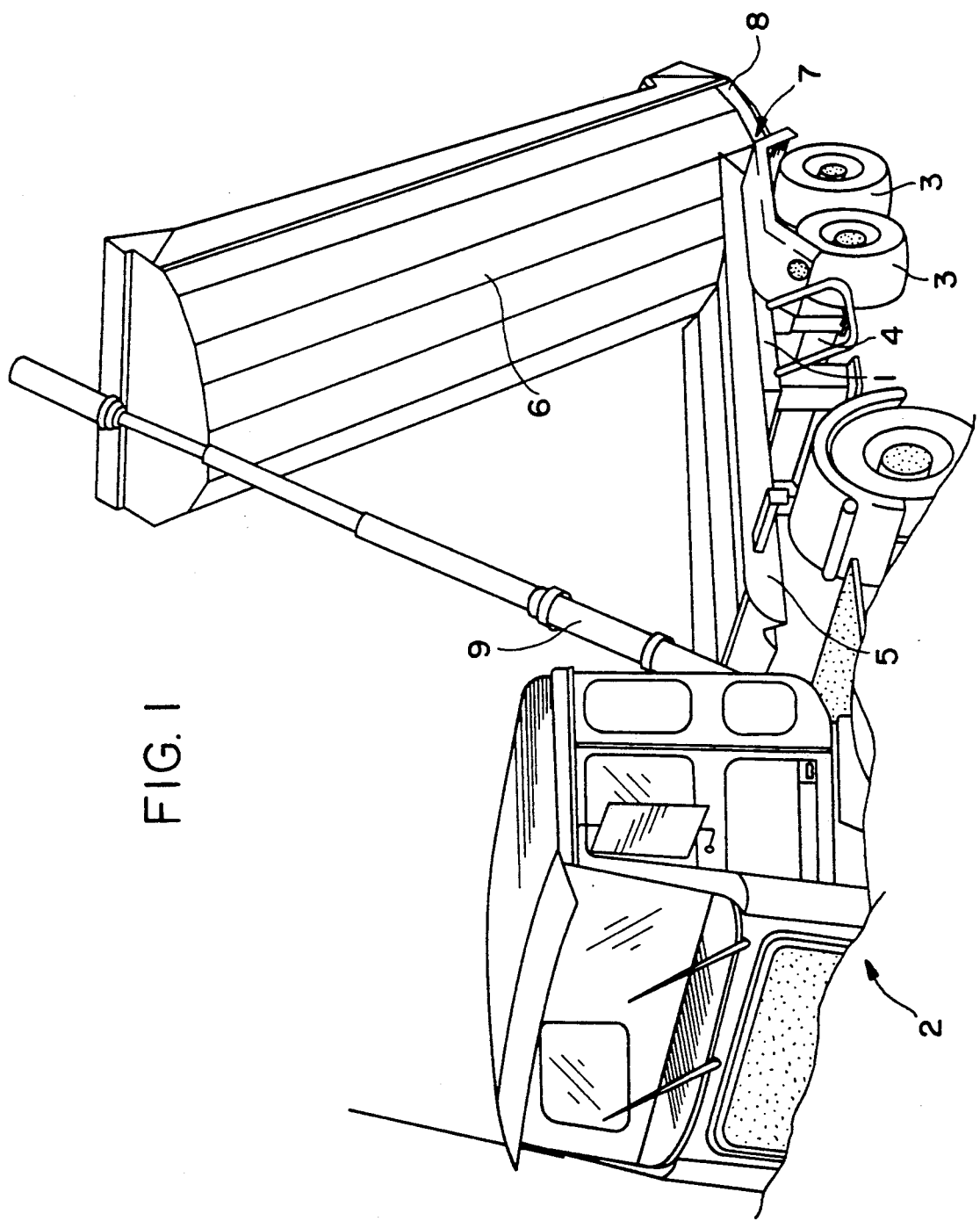
FIG. 1 is a schematic view of a dump truck according to the invention, the container of the dump body being in its elevated position.

In this drawing, there is designated schematically at 1 the chassis of the truck equipped in the usual manner with a cab 2 and wheels 3 carried by axles 4.

The chassis 1 forms, in its upper portion, a cradle 5 which is integrated with the chassis. In this chassiscradle, rests a dump body 6 tiltable from front to rear about an axis 7, under the action of a jack 9 so as to permit discharge through a rear panel 8 of the charge contained in the dump body 6.

According to the invention, the cradle 5 and the dump body 6 each partially encloses a volume which, in the case shown by way of example is generally prismatic in cross section, that is to say whose perpendicular section (FIG. 2) has the shape of a portion of a regular polygon the common center of whose sides is situated at 0, on the horizontal diameter delimiting the volume of dump body 6.

It thus results that each of cradle and dump body 5 and 6 is composed of a set of longitudinal panels 5' and 6' joined along the edges 5" and 6".

This structure in the form of planar panels joined by their edges possesses the best rigidity and the most efficient resistance to the flexure forces resulting from the repeated action of the jack 9 on the end of the dump body 6.

The dump body 6 which serves as a container comes to interfit only in its lower portion 10 exactly in the cradle 5, which is concentric therewith, producing the numerous advantages set forth above with respect to existing materials for the same purpose.

Other than the preceding advantages, the following particulars may be mentioned:

all the accessory equipment (suspension, braking system, lifting jack systems, hitching device, wheels and tires, lights, etc. . . . ) remain entirely unchanged from those used at present and thus may be easily adapted to this new construction.

It will be understood that the preceding description does not entail any limiting character and the present patent application encompasses, to the contrary, all varying embodiments of the invention, in all its possible applications, and especially all the ratios of openings between the container and the cradle.

In particular, the transverse section of each prismatic volume may also consist of a circle or of an irregular polygon. In this latter case it will be understood that the dimensions of the sides of the polygons, corresponding to the cradle and to the lower part of the container, will be arranged so as to ensure the perfect interfitting of the one of these two parts, lower part of the container and cradle of which the two sections must permit the interfitting of the lower part of the container in the cradle.

I claim:

1. A vehicle of the type having a dumping body, comprising a container (6) resting on a chassis (1) of the vehicle, means interconnecting the container (6) and the chassis (1) for vertical swinging movement of the container relative to the chassis about a transverse horizontal axis, said container having a lower surface that is downwardly convex in a vertical plane parallel to said axis, said chassis (1) comprising a fixed cradle (5), said cradle (5) having an upper surface that is upwardly concave in said vertical plane, said convex lower surface and said concave upper surface being in nesting surface contact with each other when said container (6) is in a lowermost position, such that a lower portion of said container (6) is nested within said cradle (5), wherein said surfaces are polygonal and each is comprised by a plurality of flat sides interconnected at obtuse angles.

* * * * *